United States Patent [19]

Streeter

[11] 4,388,090

[45] Jun. 14, 1983

[54] AIR SCRUBBER

[76] Inventor: Arnet Streeter, 14897 Cruse, Detroit, Mich. 48227

[21] Appl. No.: 278,555

[22] Filed: Jun. 29, 1981

[51] Int. Cl.³ .......................................... B01D 47/00
[52] U.S. Cl. ...................................... 55/228; 55/229; 55/257 R; 261/3; 261/4; 261/7; 261/25; 261/78 A; 261/118; 261/DIG. 75
[58] Field of Search ................... 55/228, 229, 257 R; 261/3, 4, 7, 25, 78 A, 118, DIG. 75

[56] References Cited

U.S. PATENT DOCUMENTS

| 99,343 | 5/1911 | Brewster | 261/3 |
|---|---|---|---|
| 824,469 | 6/1906 | Cline | 261/3 |
| 3,353,335 | 11/1967 | Caballero | 55/229 |
| 3,572,264 | 3/1971 | Mercer | 110/8 |
| 3,640,054 | 2/1972 | Katz | 261/118 |
| 3,667,193 | 6/1972 | McKenzie | 261/25 |
| 3,733,782 | 5/1973 | Hatchel | 55/95 |
| 3,761,066 | 9/1973 | Wheeler | 261/78 A |
| 3,884,653 | 5/1975 | Capulli et al. | 55/229 |
| 3,904,376 | 9/1975 | Kawata | 23/284 |
| 4,047,891 | 9/1977 | Schuetz | 23/230 |
| 4,170,458 | 10/1979 | Hartwick | 261/DIG. 75 |

FOREIGN PATENT DOCUMENTS 2291454  6/1976  France .

Primary Examiner—David L. Lacey
Attorney, Agent, or Firm—Gifford, Van Ophem, Sheridan & Sprinkle

[57] ABSTRACT

A device for removing solid impurities from air comprising a housing defining an interior mixing chamber. The solid impurity laden air is conducted to the mixing chamber so that the air enters the chamber in a first direction. Simultaneously, water is pumped into the mixing chamber in a direction substantially perpendicular to the air flow whereupon the air and water become intermixed. A second pump then pumps this mixture into a settling tank so that the solid impurities collect in the bottom of the tank for subsequent removal.

9 Claims, 2 Drawing Figures

AIR SCRUBBER

BACKGROUND OF THE INVENTION

I. Field of the Invention

The present invention relates generally to air scrubbers and, more particularly, to an air scrubber suitable for removing solid impurities from polluted air.

II. Description of the Prior Art

There have been a number of previously known air scrubbers designed to remove solid impurities and other pollutants from the air. Such air scrubbers are commonly used in industrial environments where air pollution would otherwise form a safety hazard. In addition, many government regulations now limit the amount of pollutants which can be exhausted into the air.

These previously known air scrubbers, however, are disadvantageous in that they are complex and expensive in construction. Furthermore, these previously known air scrubbers consume large amounts of electrical power and, therefore, involve high operating costs.

SUMMARY OF THE PRESENT INVENTION

The present invention overcomes the above mentioned disadvantages of the previously known air scrubbers by providing an air scrubber for use in an industrial environment which is inexpensive both in construction and operating costs.

In brief, the air scrubber according to the present invention comprises a housing defining an elongated and preferably cylindrical mixing chamber. Air which is laden with solid impurities and/or other pollutants, i.e., polluted air, is fed to the mixing chamber by appropriate duct work so that the polluted air enters the mixing chamber in a first direction. The polluted air can originate from any source, such as the exhaust from a smoke stack.

The air scrubber further comprises a settling tank assembly in which water is contained. A first pump pumps water from the settling tank and into the mixing chamber so that the water enters the mixing chamber in a direction substantially perpendicular to the polluted air flow into the mixing chamber. Simultaneously, a second pump pumps water from the mixing chamber and into the settling tank.

In operation, a substantially continuous stream of water is circulated from the settling tank and to the mixing chamber, where the water and polluted air becomes intermixed with the mixing chamber and this mixture is then pumped by the second pump to the settling tank. The solid impurities within the polluted water settle to the bottom of the settling tank for subsequent removal while the now clean air escapes from the top of the settling tank and into the atmosphere. In addition, in the preferred form of the invention, the settling tank assembly comprises a primary tank in which most of the solid impurities are collected, and a secondary tank fluidly connected to the primary tank by an overflow pipe. The inlet of the first pump is open to the secondary tank while the outlet from the second pump is open to the primary tank.

BRIEF DESCRIPTION OF THE DRAWING

A better understanding of the present invention will be had upon reference to the following detailed description when read in conjunction with the accompanying drawing, wherein like reference characters refer to like parts throughout the several views and in which.

DETAILED DESCRIPTION OF A PREFERRED EMBODIMENT OF THE PRESENT INVENTION

Figure 1:
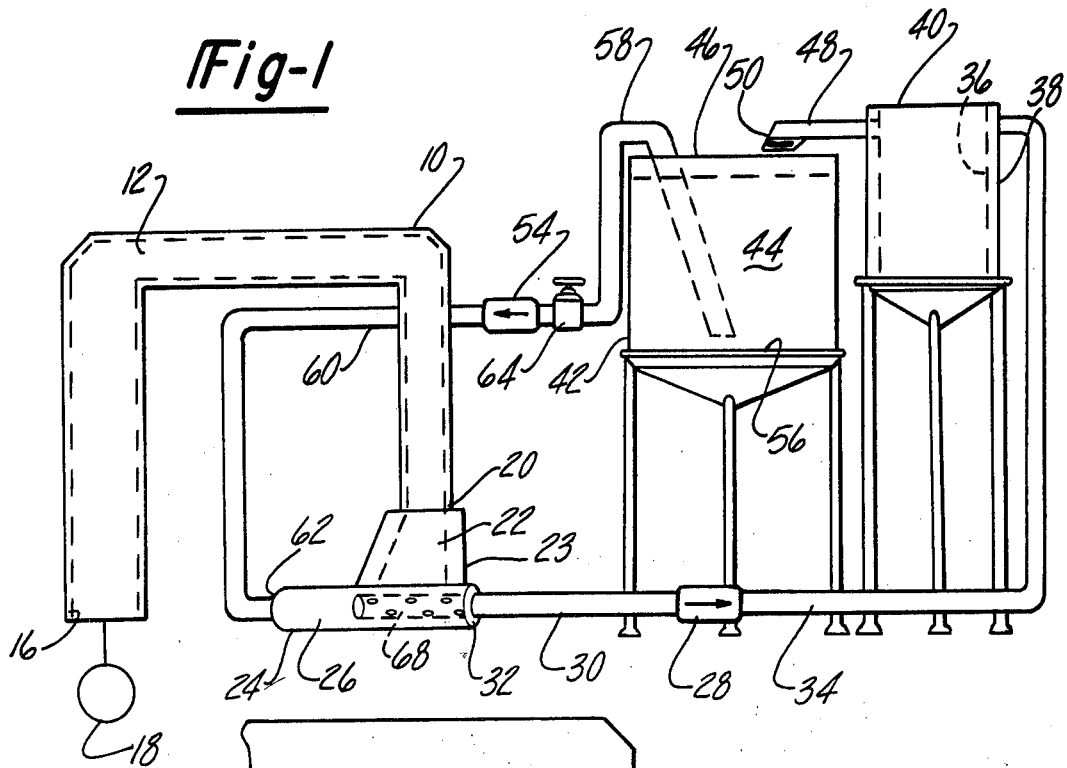
FIG. 1 is a side view illustrating a preferred embodiment of the present invention.

With reference to FIG. 1, a first preferred embodiment of the present invention is thereshown and comprises a duct 10 defining an interior channel 12. One end 16 of the duct 10 is open to a source of solid impurity laden air, or polluted air. The source 18 is preferably of the type found in an industrial environment, such as the exhaust from a smoke stack.

The duct 10 channels the polluted air from its end 16, through the channel 12 out the opposite end 20 and into an entry chamber 22 formed by an entry housing 23. The entry housing 23 can be constructed from any appropriate material, such as sheet metal.

The present invention further comprises a housing 24 defining an elongated interior chamber 26 which is generally cylindrical in cross sectional shape. The lower end of the entry chamber 22 is open to the mixing chamber 26 so that the polluted air from the source 18 flows through the duct 10 and into the mixing chamber 26.

A pump 28 is fluidly connected by a conduit 30 to one end 32 of the mixing chamber 26 so that, upon actuation of the pump 28, the pump 28 inducts fluid from the mixing chamber 26 out through the conduit 30 and to the pump 28. the outlet of the pump 28, in turn, is connected by a fluid conduit 34 to the interior 36 of a primary settling tank 38. The settling tank 38 is open at its upper end 40 and the conduit 34 is open to the interior 36 of the tank 38 adjacent its upper end 40.

The present invention further comprises a secondary settling tank 42 having an interior chamber 44 which is greater in volumetric size than the first settling tank 38. The top 40 of the first settling tank 38, moreover, is positioned above the top 46 of the secondary tank 42. One end of a horizontally or downwardly extending overflow pipe 48 is open to the interior of the primary settling tank 38 adjacent its upper end 40. The other end 50 of the overflow pipe 48 is open to the interior 44 of the secondary settling tank 42. Thus, whenever the water level within the primary tank 38 reaches the overflow pipe 48 the water flows through the overflow pipe 48 and into the secondary settling tank 42.

The inlet of a second water pump 54 is fluidly connected by a conduit 58 to the interior 44 of the second tank 42 adjacent its lower end 56. The outlet of the second pump 54, in turn, is connected by a further conduit 60 to the end 62 of the mixing chamber 26 opposite from the mixing chamber end 32. A fluid valve 64 is also preferably disposed in series between the second pump 54 and the conduit 58 and the valve 54 acts as a shut off valve when desired.

In operation, the interior chambers 44 and 36 of the secondary and primary settling tanks 42 and 38, respectively, are initially filled with water. Thus, upon activation of the pumps 54 and 28, an axial flow of water through the mixing chamber 26 is established and this water flow, after passing through the mixing chamber 26, progressively flows through the primary tank 38, secondary tank 42 and back to the inlet of the second pump 54 thus forming a substantially continuous closed loop water flow through the air scrubber.

Simultaneously, polluted air from the source 18 flows into the mixing chamber 26 through the duct 10 and entry chamber 22 and this polluted air becomes intermixed with the water flow through the mixing chamber 26.

A primary advantage of the air scrubber of the present invention is that the water flow through the mixing chamber 26 is in a direction generally perpendicular to the inflow of polluted air into the mixing chamber 26. This provision enhances the intermixing of the water with the polluted air. Furthermore, preferably the conduit 30 between the mixing chamber 26 and the first pump 28 includes a perforated portion 68 extending axially partway through the mixing chamber 26. The perforated portion 68 of the conduit 30 further increases the turbulence of the air and water flow within the mixing chamber 26 to ensure that the polluted air becomes completely intermixed with the water.

The resulting mixture of the water and the polluted air is inducted out through the conduit 30 by a first pump 28 and subsequently pumped through the conduit 34 and into the primary settling tank 38. When this occurs, the solid particulate matter or solid impurities within the polluted air gravitate to the bottom of the primary settling tank 38 while the now clean air escapes upwardly through the open top 40 of the primary settling tank 38. Appropriate means (not shown) are used to periodically clean the collected solid particulate matter from the bottom of the primary settling tank.

Since most of the impurities within the water gravitate to the bottom of the primary settling tank 38, substantially clean water flows from the primary tank 38, through the overflow pipe 48 and into the secondary settling tank 42. Thus, the water induced from the secondary tank 42 by the second pump 44 is relatively clean. However, any particulate matter remaining within the water as it flows from the first tank 38 and to the second tank 42 also gravitates to the bottom 56 of the secondary tank 42 and appropriate means are used to clean the secondary tank 42 as required. Other means for communicating water from one tank to another, when the level of water in said one tank exceeds a given level, are of course known in the art and may replace the overflow pipe for the purpose given herein.

Figure 2:
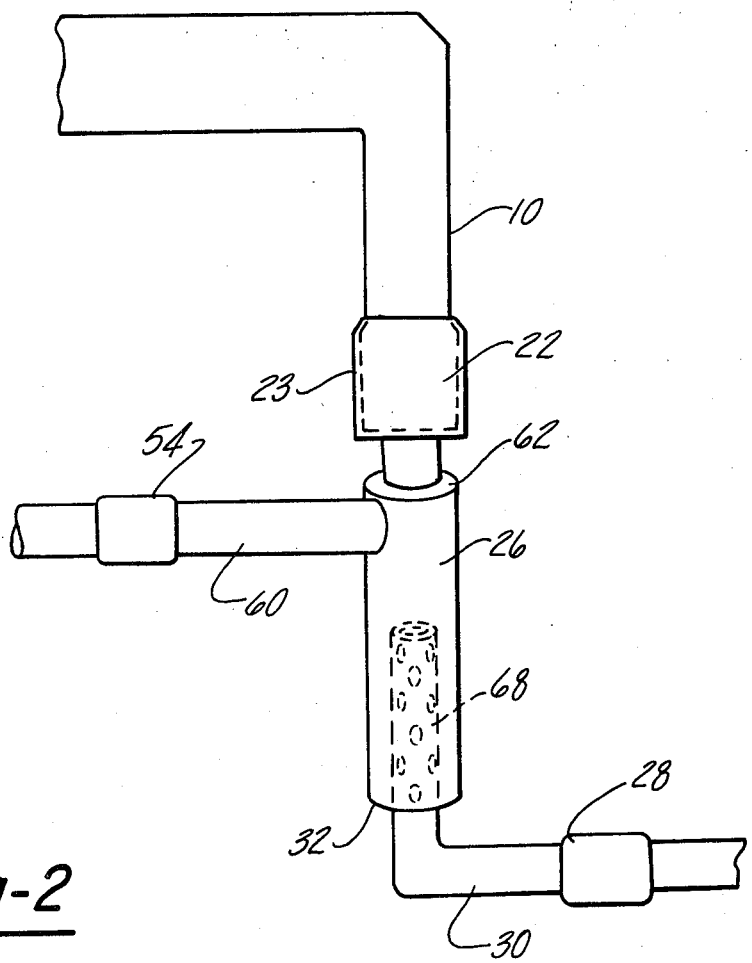
FIG. 2 is a fragmentary view illustrating a modification thereof.

With reference now to FIG. 2, a modification to the air scrubber is thereshown. In FIG. 2, the duct work 10 through which the polluted air passes is open via the entry chamber 22 to the axial end 62 of the mixing chamber 26 rather than one side of the mixing chamber 26 as shown in FIG. 1. In addition, the conduit 60 between the second pump 54 and the mixing chamber 26 is connected to the mixing chamber 26 adjacent its upper end 62 so that the water flow from the conduit 60 and into the mixing chamber 26 is generally radial in direction and also perpendicular to the flow of polluted air into the mixing chamber. As before, the first pump 28 is fluidly connected to the opposite end 32 of the mixing chamber 26 by the conduit 30 having a perforated portion 68 extending axially partway through the mixing chamber 26. The modification of the invention in FIG. 2 further differs from the embodiment shown in FIG. 1 in that the mixing chamber extends substantially vertically, rather than horizontally.

From the foregoing, it can be seen that the present invention provides an air scrubber to remove solid impurities from the air which is relatively inexpensive in both construction and operating costs. A primary feature of the present invention is that the clean water inlet into the mixing chamber 26 intersects the polluted air in flow to the mixing chamber 26 generally perpendicularly thus enhancing the intermixing of the water with the polluted air. The perforated portion 68 of the outlet conduits from the mixing chamber 26 further enhances the intermixing of the polluted air with the water before the resulting mixture is pumped to the settling tank 38.

Another important feature of the invention is that escape of the cleansed air from the circulated stream of water occurs after the exit of the stream from the second pumping means. A still further feature is that the housing has no constriction at the location where the air is introduced into the fluid that would increase the back-pressure in the system, due to increased resistance to flow through that restriction.

Having described my invention, however, many modifications thereto will become apparent to those skilled in the art to which it pertains without deviation from the spirit of the invention as defined by the scope of the appended claims.

I claim:

1. A water utilizing device for removing impurities from air comprising:
    a housing defining a mixing chamber;
    a settling tank assembly adapted to contain said water;
    means fluidly connecting said mixing chamber and said settling tank assembly for circulating a substantially continuous stream of said water, first from said settling tank assembly to said mixing chamber, and second from said mixing chamber to said settling tank assembly; said circulation means comprising first means fluidly connecting said settling tank assembly and said mixing chamber, first pump means fluidly connected to said first means for pumping said water from said settling tank assembly and to said mixing chamber so that water enters said mixing chamber in a first direction, and second means fluidly connecting said mixing chamber and said settling tank assembly, second pump means fluidly connected to said second means for pumping said water from said mixing chamber and to said settling tank assembly; and
    means for conducting impurity laden air to said chamber so that said air enters said mixing chamber in a second direction, said second direction being substantially perpendicular to said first direction,
    whereby said air is introduced into said water stream at a location in said stream between said first and second pumping means and is thereby cleansed of said impurities.

2. The device as defined in claim 1 wherein said mixing chamber is elongated along an axis thereof.

3. The device as defined in claim 2 wherein said first direction is substantially parallel to said axis of said mixing chamber.

4. The device as defined in claim 2 wherein said second direction is substantially parallel to said axis of said mixing chamber.

5. The device as defined in claim 2 and further comprising a perforated tube extending axially from one end of the mixing chamber and partway into said mixing chamber, and wherein said second fluid connection means is fluidly connected to said perforated tube.

6. The device according to claim 2 wherein said housing comprises a wall and a pair of opposing ends; and said second pumping means is fluidly connected to said chamber through one of said ends of said housing, said first pumping means is connected to said chamber through either the other of said ends of said housing or the wall of said housing, and said conducting means is connected to said chamber through either the wall of said housing or the other of said ends of said housing.

7. The device as defined in claim 1 wherein said settling tank assembly further comprises a primary tank and a secondary tank, said second fluid connection means having an outlet fluidly connected to said primary tank and said first fluid connection means having an inlet fluidly connected to said secondary tank, and said fluid circulating means further comprises means for communicating water from said primary tank and to said secondary tank whenever the water in said primary tank exceeds a perdetermined level.

8. The device as defined in claim 7 wherein said communicating means comprises an overflow pipe open at one end to said primary tank at said level and open at its other end to said secondary tank.

9. The device as defined in claim 1 wherein that portion of said circulation means between said first and second pumping means is unconstricted, relative to other portions of said circulation means, whereby interference with said water stream due to back pressure from constriction is eliminated.

* * * * *

UNITED STATES PATENT AND TRADEMARK OFFICE
CERTIFICATE OF CORRECTION

PATENT NO. : 4,388,090
DATED : June 14, 1983
INVENTOR(S) : Harold F. Streeter

It is certified that error appears in the above—identified patent and that said Letters Patent is hereby corrected as shown below:

Column 2, line 34 delete "the" insert --The--.

Column 2, line 62 delete "settling" insert --setting--.

Column 3, line 22 delete "a" insert --the--.

Column 3, line 36 delete "induced" insert --inducted--.

Column 6, Claim 7, line 3 delete "perdetermined" insert --predetermined--.

Signed and Sealed this

Twenty-eighth Day of February 1984

[SEAL]

Attest:

GERALD J. MOSSINGHOFF

Attesting Officer     Commissioner of Patents and Trademarks